United States Patent
Horvitz et al.

(10) Patent No.: US 7,457,768 B2
(45) Date of Patent: Nov. 25, 2008

(54) METHODS AND APPARATUS FOR PREDICTING AND SELECTIVELY COLLECTING PREFERENCES BASED ON PERSONALITY DIAGNOSIS

(75) Inventors: Eric J. Horvitz, Kirkland, WA (US); David M. Pennock, Lawrenceville, NJ (US)

(73) Assignee: Microsoft Corporation, Redmond, WA (US)

(*) Notice: Subject to any disclaimer, the term of this patent is extended or adjusted under 35 U.S.C. 154(b) by 559 days.

(21) Appl. No.: 10/686,198

(22) Filed: Oct. 15, 2003

(65) Prior Publication Data

US 2004/0076936 A1 Apr. 22, 2004

Related U.S. Application Data

(63) Continuation of application No. 09/629,217, filed on Jul. 31, 2000, now Pat. No. 6,655,963.

(51) Int. Cl.
*G06Q 30/00* (2006.01)
*G06F 17/30* (2006.01)
*G07F 7/00* (2006.01)
*G07G 1/14* (2006.01)

(52) U.S. Cl. .............................. 705/26; 705/14; 705/27

(58) Field of Classification Search ................. 434/236; 707/1, 7, 10; 705/1, 10, 26, 27, 14, 400
See application file for complete search history.

(56) References Cited

U.S. PATENT DOCUMENTS

| | | | |
|---|---|---|---|
| 5,659,731 A | 8/1997 | Gustafson | |
| 5,704,017 A | 12/1997 | Heckerman et al. | |
| 5,842,199 A | 11/1998 | Miller et al. | |
| 5,884,282 A | 3/1999 | Robinson | |
| 5,915,243 A * | 6/1999 | Smolen | 705/14 |
| 5,918,014 A | 6/1999 | Robinson | |
| 6,012,052 A * | 1/2000 | Altschuler et al. | 707/2 |
| 6,018,738 A * | 1/2000 | Breese et al. | 707/100 |
| 6,144,964 A | 11/2000 | Breese et al. | |
| 6,185,534 B1 | 2/2001 | Breese et al. | |
| 6,199,076 B1 | 3/2001 | Logan et al. | |
| 6,236,978 B1 | 5/2001 | Tuzhilin | |
| 6,266,658 B1 * | 7/2001 | Adya et al. | 707/2 |
| 6,272,467 B1 | 8/2001 | Durand et al. | |
| 6,345,264 B1 | 2/2002 | Breese et al. | |
| 6,353,813 B1 | 3/2002 | Breese et al. | |

(Continued)

*Primary Examiner*—Robert E Pezzuto
*Assistant Examiner*—Victor Cheung
(74) *Attorney, Agent, or Firm*—Amin, Turocy & Calvin, LLP

(57) ABSTRACT

A new recommendation technique, referred to as "personality diagnosis", that can be seen as a hybrid between memory-based and model-based collaborative filtering techniques is described. Using personality diagnosis, all data may be maintained throughout the process, new data can be added incrementally, and predictions have meaningful probabilistic semantics. Given an active entity's known attribute values, the probability that they have a same personality type as every other entity may be determined. Then, the probability that they will have a given value for a valueless attribute may be determined based on the entity's personality type. The probabilistic determination may be used to determine expected value of information that could be used to favorably order queries for attribute values, thereby mollifying what could otherwise be a tedious and frustrating process and/or to determine which entries of a database if removed would have a minimal effect of the accuracy of recommendations.

33 Claims, 7 Drawing Sheets

U.S. PATENT DOCUMENTS

| | | | |
|---|---|---|---|
| 6,366,905 B1 * | 4/2002 | Netz ............................. 707/3 |
| 6,405,159 B2 | 6/2002 | Bushey et al. |
| 6,487,539 B1 | 11/2002 | Aggarwal et al. |
| 6,571,234 B1 * | 5/2003 | Knight et al. ................... 707/3 |
| 6,643,645 B1 * | 11/2003 | Fayyad et al. .................. 707/6 |
| 6,655,963 B1 * | 12/2003 | Horvitz et al. .............. 434/236 |
| 6,685,479 B1 * | 2/2004 | Ghaly ........................ 434/236 |
| 2001/0013009 A1 | 8/2001 | Greening et al. |
| 2002/0045154 A1 | 4/2002 | Wood et al. |
| 2002/0052873 A1 | 5/2002 | Delgado et al. |
| 2002/0065802 A1 | 5/2002 | Uchiyama |
| 2002/0107853 A1 | 8/2002 | Hofmann et al. |

* cited by examiner

100

METHODS AND APPARATUS FOR PREDICTING AND SELECTIVELY COLLECTING PREFERENCES BASED ON PERSONALITY DIAGNOSIS

CROSS REFERENCE TO RELATED APPLICATION

This application is a continuation of U.S. Pat. application Ser. No. 09/629,217, filed on Jul. 31, 2000, issued as U.S. Pat. No. 6,655,963 on Dec. 2, 2003, and entitled "Methods and Apparatus for Predicting and Selectively Collecting Preferences Based on Personality Diagnosis." The entirety of this application is incorporated herein by reference.

§ 1. BACKGROUND OF THE INVENTION

§ 1.1 Field of the Invention

The present invention concerns predicting and selectively collecting attribute values, such as a person's preferences, as might be indicated by item ratings for example. Such item ratings may be used for recommending items.

§ 1.2 Related Art

In last decade or so, computers have become increasingly interconnected by networks, and via the Internet. The proliferation of networks, in conjunction with the increased availability of inexpensive data storage means, has afforded computer users unprecedented access to a wealth of data. Unfortunately, however, the very vastness of available data can overwhelm a user. Desired data can become difficult to find and search heuristics employed to locate desired data often return unwanted data.

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through menus. If a user mistakenly believes that a category will be of interest or include what they were looking for, but the category turns out to be irrelevant, the user must backtrack through one or more hierarchical levels of categories. Moreover, such services which provide hierarchical menus of categories are passive. That is, a user must actively navigate through the hierarchical menus of categories.

Again in the context of the Internet for example, some services provide "search engines" which search databased content or "web sites" pursuant to a user query. In response to a user's query, a rank ordered list, which includes brief descriptions of the uncovered content, as well as hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content to be returned in response to a query. Again, unfortunately, the very wealth of available content impairs the efficacy of these search engines since it is difficult to separate irrelevant content from relevant content.

Moreover, as was the case with services which provide hierarchical menus of categories, search engines are passive. That is, a user must actively submit a query. To address this disadvantage, systems for recommending an item, such as content, to a user have been implemented.

§ 1.2.1 Recommender Systems

So-called "recommender systems" have been implemented to recommend an item, such as content, a movie, a book, or a music album for example, to a user. The growth of Internet commerce has stimulated the use of collaborative filtering algorithms as recommender systems. (See, e.g., the article, Schafer et al., "Recommender Systems in E-Commerce", *Proceedings of the ACM Conference on Electronic Commerce*, pp. 158-166 (November 1999), hereafter referred to as "the Schafer article".) Although collaborative filtering may be known to one skilled in the art, it is introduced below for the reader's convenience.

§ 1.2.2 Collaborative Filtering

In view of the drawbacks of the above discussed data location concepts, "collaborative filtering" systems have been developed. A goal of collaborative filtering is to predict the attributes of one user (referred to as "the active user"), based on the attributes of a group of users. Given the growth of Internet commerce, a valuable attribute to predict is an active user's preference for an item. For example, given the active user's ratings for several movies and a database of other users' movie ratings, a collaborative filtering system may be used to predict how the active user would rate movies not seen by the active user (but rated by the other users). More specifically, collaborative filtering systems have assumed that an active user will have similar attributes as similar users and, conversely, collaborative filtering systems may assume that an active user will have dissimilar attributes to dissimilar users. Again, in the context of preferences, similar users may prefer similar items and dissimilar users may prefer dissimilar items. Hence, the effectiveness of collaborative filtering methods has been predicated on the underlying assumption that human preferences are correlated.

Collaborative filtering techniques have been classified into one of two categories—memory-based and model-based. (See, e.g., the article, Breese et al., "Empirical Analysis of Predictive Algorithms for Collaborative Filtering", *Proceedings of the Fourteenth Annual Conference on Uncertainty in Artificial Intelligence*, pp. 43-52 (July 1998), hereafter referred to as "the Breese article".) Memory-based collaborative filtering techniques, and drawbacks of such techniques, are introduced in § 1.2.2.1 below. Then, model-based collaborative filtering techniques, and drawbacks of such techniques, are introduced in § 1.2.2.2 below.

§ 1.2.2.1 Memory-Based Collaborative Filtering Techniques and Their Shortcomings Memory-based collaborative filtering techniques maintain a database of all users' known attribute values (e.g., item ratings). Each predicted attribute value requires a computation using data from across the entire database.

Examples of memory-based collaborative filtering techniques may be found in the Breese article. Basically, collaborative filtering uses known attribute values (e.g., explicitly entered votes) of a new user (referred to as "the active case") and known attribute values of other users to predict values of attributes with unknown values of the new user (e.g., attribute values not yet entered by the new user). The mean vote $\overline{v}_i$ for an entity may be defined as:

$$\overline{v}_i = \frac{1}{M_i} \sum_{j \in I_i} v_{i,j}$$

where
- $v_{i,j}$ = A value of attribute j of entity i. Typically, an integer value.
- M = The number of attributes (e.g., in a database).
- $I_i$ = A set of attribute indexes for which entity I has known values (e.g., based on an explicitly entered vote). For example, I2={3,4} means that entity 2 has values for attributes 3 and 4.
- $M_i$ = The number of attributes for which entity i has known values—the number of elements in $I_i$.

Denoting parameters for the active case (i.e., new entity) with subscript "a", a prediction $P_{a,j}$ of active case attribute values (e.g., item ratings) for attributes without known values (i.e., attributes not in $I_a$) can be defined as:

$$p_{a,j} = \overline{v_a} + K \sum_{i=1,n} (v_{i,j} - \overline{v_i}) w_{a,i}$$

where
- K is a normalizing factor such that the absolute values of the weights sum to unity.
- n = The number of entities (e.g., users in a database).
- $w_{a,i}$ = The estimated weight (or alternatively match) between entity i and entity a.
- $P_{i,j}$ = The predicted value of attribute j of entity i.

Hence, a predicted attribute value (e.g., item rating) is calculated from a weighted sum of the attribute values (e.g., votes) of each other user. The appearance of mean values in the formula merely serves to express values in terms of deviation from the mean value (i.e., defines a reference) and has no other significant impact.

The weights can reflect distance, correlation, or similarity between each user "i" and the active user. Many collaborative filtering algorithms differ in the details of the "weight" calculation. Two examples of weight determination techniques are correlation and vector similarity, each of which is briefly introduced below.

The use of correlation for a weight calculation appears in the article, Resnick et al., "Grouplens: An Open Architecture for Collaborative Filtering of Netnews", *Proceedings of the ACM* 1994 *Conference on Computer Supported Cooperative Work*, pp. 175-186 (1994) (hereafter referred to as "the Grouplens article"). If a Pearson correlation coefficient is defined as the basis for the weights, the correlation between users "a" and "i" can be expressed as:

$$w(a, i) = \frac{\sum_j (v_{a,j} - \overline{v_a})(v_{i,j} - \overline{v_i})}{\sqrt{\sum_j (v_{a,j} - \overline{v_a})^2 \sum_j (v_{i,j} - \overline{v_i})^2}}$$

where the summations over j are over the items for which both users "a" and "i" have recorded rating votes.

In the field of information retrieval, the similarity between two documents is often measured by treating each document as a vector of word frequencies and computing the cosine of the angle formed by the two frequency vectors. This concept can be adapted to collaborative filtering, where users correspond to documents, item titles correspond to words and votes or ratings correspond to word frequencies. Observed votes indicate a positive preference—there is no role for negative votes and unobserved items receive a zero vote. If a cosine distance between feature vectors is used as the basis for the weights, the correlation between users "a" and "i" can be expressed as:

$$w(a, i) = \sum_j \frac{v_{a,j}}{\sqrt{\sum_{k \in I_a} v_{a,k}^2}} \frac{v_{i,j}}{\sqrt{\sum_{k \in I_a} v_{i,k}^2}}$$

where the squared terms in the denominators serve to normalize votes so that users that vote on more titles will not, a priori, be more similar to other users. Other normalization schemes, including absolute sum and number of votes, are possible.

Memory-based collaborative filtering algorithms can be improved in a number of ways, as described in the Breese article, such as using default voting, considering inverse user frequency, and amplifying weights, for example.

Since each predicted attribute requires a computation using data from across the entire database, memory-based collaborative filtering techniques can become computationally expensive, in terms of both time and space, especially as the size of the database grows. More specifically, each predicted attribute may require a computation on the order of the number of users and the number of attributes (e.g., the number of items rated by any user).

On the positive side, memory-based methods are relatively simple and work reasonably well in practice. Unfortunately, however, their simplicity does not yield any insights into how a prediction was obtained. Thus, memory-based collaborative filtering techniques have a "black box" characteristic in that user attributes are provided and a predicted attribute is output.

Fortunately, with memory-based collaborative filtering techniques, new information, such as a user attribute (e.g., a user's preference for a particular item) may be added easily and incrementally.

In view of the foregoing, memory-based collaborative filtering techniques have a number of shortcomings. More specifically, each prediction may be computationally expensive in terms of memory and time, and insights into how a prediction was arrived out are not offered.

§ 1.2.2.2 Model-Based Collaborative Filtering Techniques and Their Shortcomings

Model-based collaborative filtering techniques compile users' attributes (e.g., item preferences) into a descriptive model of users, attributes (e.g., items) and attribute values (e.g., item ratings). An unknown attribute value (e.g., an item rating) of a user can then be predicted based on the compiled model. That is, from a probabilistic perspective, collaborative filtering may be seen as determining the expected value of a vote, given what is known about a user. For an active user, assuming votes are integer values with a range from 0 to m, the probability that the active user will have a particular vote value for a particular item j may be expressed as:

$$p_{a,j} = E(v_{a,j}) = \sum_{i=0}^{m} Pr(v_{a,j} = i | v_{a,k}, k \in I_a) i$$

where the probability expression is the probability that the active user will have a particular vote value for item j given the previously observed votes. Cluster models and Bayesian networks may be used as probabilistic models for collaborative filtering. (See, e.g., the Breese article.) Each is briefly introduced below.

In the cluster model, the probability of votes are conditionally independent given membership in an unobserved class variable C which takes on some relatively small number of discrete values. That is, there are certain groups or types of users capturing a common set of preferences and tastes. Given the class, the preferences regarding the various items are independent. The probability model relating joint probability of class and votes to a tractable set of conditional and marginal distributions is the standard naive Bayes formulation, namely:

$$Pr(C = c, v_1, \ldots, v_n) = Pr(C = c) \prod_{i=1}^{n} Pr(v_i | C = c)$$

The left-hand side of this expression is the probability of observing an individual of a particular class and a complete set of vote values. The parameters of the model, namely the probabilities of class membership and the conditional probabilities of votes given a class, are estimated from a training set of user votes. Since the class variables are not observed in the database of users, methods that can learn parameters for models with hidden variables, such as the EM algorithm, may be used. The number of classes may be selected by selecting the model structure that yields the largest (approximate) marginal likelihood of the data in the user database.

Alternatively, a Bayesian network with a node corresponding to each item in the domain may be used for model-based collaborative filtering. The states of each node correspond to the possible vote values (which may include a "no vote" value) for each item. A learning algorithm is then applied. The learning algorithm searches over various model structures in terms of dependencies for each item. After the learning process, in the resulting Bayesian network, each item will have a set of parent items that are the best predictors of its votes. Each conditional probability table is represented by a decision tree encoding the conditional probabilities for that node.

As can be appreciated from the foregoing description of model-based collaborative filtering techniques, model-based collaborative filtering techniques may advantageously provide meaningful semantics and may yield insights into its predictions. Further, any assumptions in the model are explicit. Finally, compiled models take up relatively little storage and predictions based on compiled models are, relative to memory-based collaborative filtering techniques, computationally efficient, both from a time viewpoint and a memory viewpoint.

Unfortunately, compiling the model is often computationally expensive. This would not be a major drawback if the model did not need to be updated often. However, in order to account for new data, the model must be recompiled. In some applications, delaying the consideration of new data is not an option.

An example of a model-based collaborative filtering technique is described in U.S. Pat. No. 5,704,017, issued on Dec. 20, 1997 to Heckerman et al., and entitled, "Collaborative Filtering Utilizing a Belief Network" (incorporated herein by reference).

§ 1.2.2.3 Challenges for Gathering Data (e.g., Item Ratings)

Recommender systems having practical applications have been designed to acquire information (e.g., to populate the database of a memory-based collaborative filtering system or to compile the model of a model-based collaborative filtering system) by (a) explicitly asking user for information (e.g., item ratings) and/or (b) implying attributes of users (e.g., based on hardware and/or software of the user's computer, based on Internet content browsing behaviors of the user, based on purchasing behaviors of the user, etc.). Unfortunately, both explicit and implicit data acquisition have their drawbacks.

Regarding some drawbacks of implicit data acquisition, users are forced to actively participate. In the context of predicting user preferences for items for example, users must explicitly enter ratings. Some users find it difficult to rate items, such as articles, books, movies, products, etc. In this regard, it is expected that predictions made by collaborative filter will improve as more information (e.g., item ratings) is entered. Unfortunately, many users may become frustrated by poor predictions and/or with entering information (e.g., item ratings) before enough information (e.g., item ratings) is gathered to make the predictions made by collaborative filtering systems good. Thus, the collaborative filtering systems which rely on explicitly entered information have a bootstrapping problem. That is, many users will become frustrated with the predictions made by collaborative filtering systems, due, in part, to an initial scarcity of information. As a result of user frustration with initially poor predictions, such users may stop entering information. If this occurs, the predictions made by the collaborative filtering system will probably not improve because users will not provide it with enough information.

Implicitly acquired data does not require active user participation. Unfortunately, however, implicitly acquired information is often considered to be less reliable than information acquired explicitly. For example, one could infer that a user is relatively old if they visit the American Association of Retired Peoples' (AARP's) web site often, but an explicit entry of the user's age is certainly better.

§ 1.2.3 Unmet Needs

Given the great utility of recommender systems, particularly in the context of E-commerce, as well as power of collaborative filtering techniques for making good recommendations, the inventors believe that collaborative filtering will be used increasingly. However, it would be useful to mitigate some of the disadvantages of pure memory-based and pure model-based collaborative filtering techniques. That is, it would be useful to provide a collaborative filtering technique that is simple and easy to update as is the case with memory-based systems, while also offering meaningful semantics and explicit assumptions as is the case with model-based systems.

Further, it would be useful to be able to predict the utility of having values (e.g., ratings or votes) for certain attributes (e.g., items). In this way, in the context of gathering data, queries seeking explicit values (e.g., votes or ratings) could be limited to avoid user frustration. That is, values would only be asked for if the benefit (e.g., an improvement to a recommendation) of having such a value would outweigh the cost (e.g., user annoyance) of asking for the value. Further, attributes (e.g., items) whose values (e.g., ratings) add little benefit to the accuracy of the recommendation could be removed from the database (thereby mitigating storage requirements which, under pure memory-based collaborative filtering techniques, are on the order of the number of attributes times the number of users) and/or ignored by the collaborative filtering technique when making a recommendation (thereby mitigating processing time which, under pure memory-based collaborative filtering techniques, are on the order of the number of attributes times the number of users).

§ 2. SUMMARY OF THE INVENTION

The present invention provides new collaborative filtering techniques which meet, at least some of, the heretofore unmet needs introduced in § 1.2.3 above. Basically, a new collaborative filtering technique, referred to as "personality diagnosis", that can be seen as a hybrid between memory-based and model-based collaborative filtering techniques, is described. More specifically, using the described personality diagnosis technique, all data may be maintained throughout the processes, new data can be added incrementally, and predictions have meaningful probabilistic semantics. Each user's reported attribute values (e.g., item ratings or preferences) may be interpreted as a manifestation of their underlying personality type. Personality type may be encoded simply as a vector of the user's "true" values (e.g., ratings) for attributes (e.g., items) in the database. It may be assumed that users report values (e.g., ratings) with a distributed (e.g., Gaussian) error. Given an active user's known attribute values (e.g., item ratings), the probability that they have the same personality type as every other user may be determined. Then, the probability that they will have a given value (e.g., rating) for a valueless (e.g., unrated) attribute (e.g., item) may then be determined based on the user's personality type.

In one embodiment of the present invention, the probabilistic determinations may be used to determine expected value of collecting additional information. Such an expected value of information could be used in at least two ways. First, an interactive recommender could use expected value of information to favorably order queries for attribute values (e.g., item ratings), thereby mollifying what could otherwise be a tedious and frustrating process. Such an value of information computation can balance the costs or difficulty of answering a question about preferences with the expected value of the information being acquired. Beyond ordering the queries to users about preferences, value of information could be used to generate the most valuable n questions to ask should a system designer wish to limit the number of questions asked of users-or accessed from a database of preferences. Second, expected value of information could be used to determine which entries of a database to prune or ignore—that is, which entries, which if removed, would have a minimal effect on the accuracy of recommendations for a population of users.

§ 3. BRIEF DESCRIPTION OF THE DRAWINGS

§ 4. DETAILED DESCRIPTION

Figure 1:
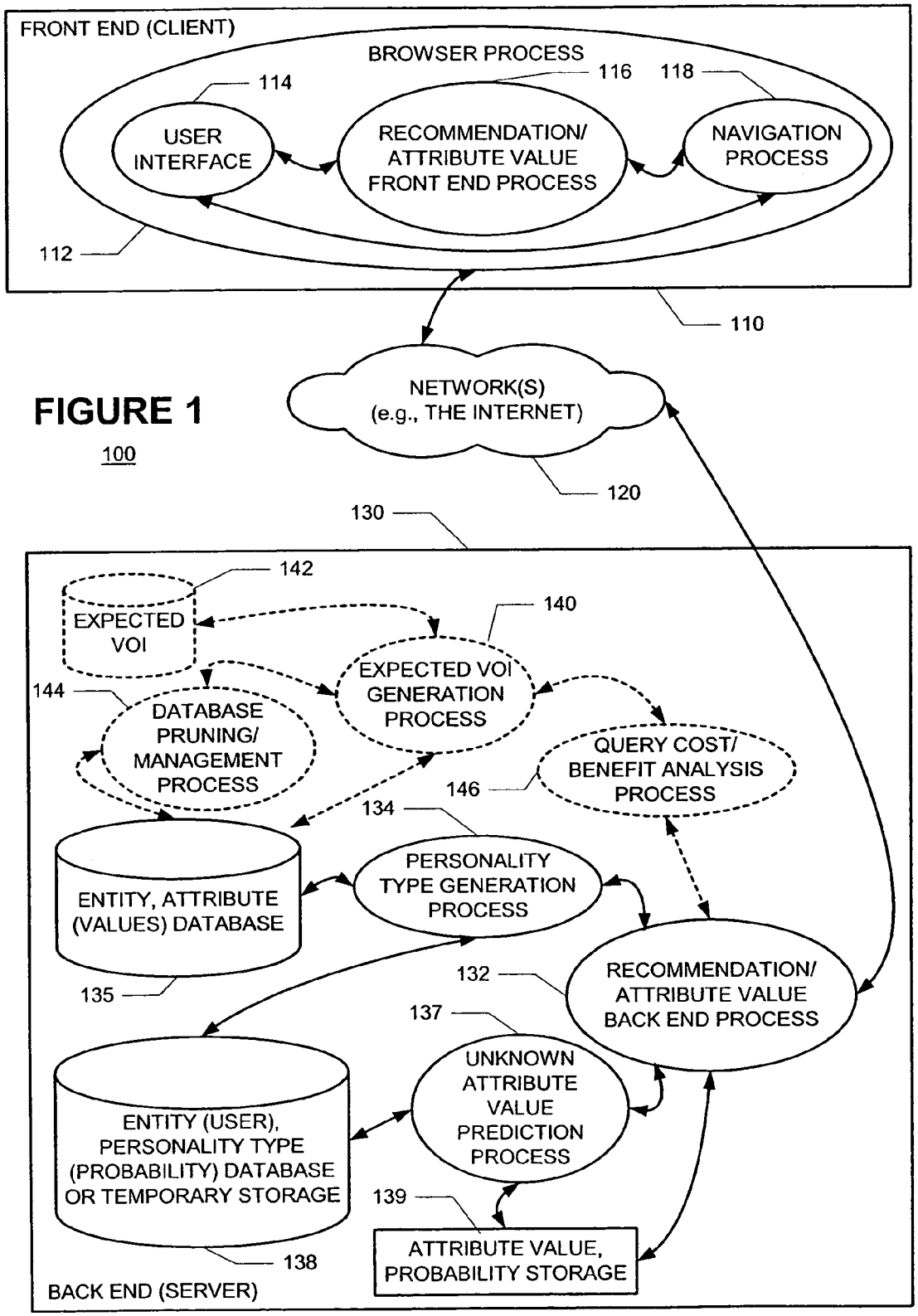
FIG. 1 is a high level bubble diagram of processes that may be performed by the present invention.

The present invention concerns novel methods, apparatus, and data structures for predicting the values of attributes (e.g., predicting items ratings to be used in recommending items) without at least some of the drawbacks of memory-based and model-based collaborative filtering systems. The following description is presented to enable one skilled in the art to make and use the invention, and is provided in the context of particular applications and their requirements. Various modifications to the disclosed embodiment will be apparent to those skilled in the art, and the general principles set forth below may be applied to other embodiments and applications. Thus, the present invention is not intended to be limited to the embodiments shown.

Functions that may be performed by the present invention are first presented in § 4.1 below. Then, exemplary processes, data structures, apparatus and methods which may be used for practicing at least some aspects of the present invention are presented in § 4.2 below. Exemplary operations of an exemplary embodiment of the present invention are presented in § 4.3 below. Finally, some concluding remarks concerning the present invention are set forth in § 4.4 below.

§ 4.1 Functions

The present invention may function to mitigate some of the disadvantages of pure memory-based and pure model-based collaborative filtering techniques. That is, the present invention provides a collaborative filtering technique that is simple and easy to update as is the case with memory-based systems, while also offering meaningful semantics and explicit assumptions as is the case with model-based systems. The present invention does so by interpreting each entity's (e.g., user's) reported preferences as a manifestation of their underlying personality type, where personality type may be encoded as a vector of the entity's "true" ratings for titles in the database.

The present invention may assume that the values of entity attributes (e.g., the users' item ratings) are reported with some variation, such as with Gaussian error for example.

The present invention may function to determine the probability that an active entity (e.g., user) has the same personality type as every other entity (e.g., user). The present invention may then function to determine probabilities that the active entity will have a particular value (e.g., rating) for a valueless attribute (e.g., unrated item). This determination may be based on the entity's (e.g., user's) personality type probabilities.

The present invention may also function to predict the utility of having values (e.g., ratings or votes) for certain attributes (e.g., items). In this way, in the context of gathering data, queries seeking explicit values (e.g., votes or ratings) could be limited to avoid user frustration. That is, values would only be asked for if the benefit (e.g., an improvement to a recommendation) of having such a value would outweigh the cost (e.g., user annoyance) of asking for the value. In one embodiment of the present invention, attributes (e.g., items) whose values (e.g., ratings) add little benefit to the accuracy of the recommendation could be removed from the database (thereby mitigating storage requirements which, under pure memory-based collaborative filtering techniques, are on the order of the number of attributes times the number of users) and/or ignored by the collaborative filtering technique when making a recommendation (thereby mitigating processing time which, under pure memory-based collaborative filtering techniques, are on the order of the number of attributes times the number of users).

§ 4.2 Processes, Data Structures, Apparatus and Methods

Processes that may be effected by the present invention, and data structures that may be used by such processes, are described in § 4.2.1 below. Then, exemplary apparatus that may be used to effect at least some of the processes are described in § 4.2.2 below. Finally, methods that may be used to effect at least some of the processes are described in § 4.2.3 below.

§ 4.2.1 Exemplary Processes and Data Structures

FIG. 1 is a high level bubble diagram of processes that may be performed by the present invention.

In this exemplary environment 100, a front end device 110 can communicate with a back end device 130 via one or more networks 120, such as the Internet for example. Briefly stated, the front end device (or client) 110 may be used to gather implicit or explicit attribute values (e.g., item ratings) and to present recommendations or predictions. The back end device (or server) 130 may be used to gather implicit or explicit attribute values (e.g., item ratings) from a number of entities (e.g., users) and to generate predicted attribute values (e.g., item ratings) for valueless attributes (e.g., unrated items) of a given entity (e.g., an active user). The back end device 130 may be a part of a server which may also (a) provide resources such as text, graphic, audio, and/or video content (also referred to as a "content provider server"), and/or (b) offer various items or services for sale (also referred to as an "E-commerce server"). Alternatively, the back end device 130 may serve such content provider and/or E-commerce servers.

More specifically referring to the front end device 110, a browser process (or more generally, a "browser") 112 may include a user interface process 114 and a navigation process 118. Such processes may be the same or similar to those found on commercially available browsers, such as the Explorer browser from Microsoft Corporation of Bellevue, Wash. The browser process 112 may also include a recommendation/attribute value front end process (or more generally, a "recommendation/attribute value front end facility") 116. This process 116 may work in conjunction with the user interface process 114 to request explicit attribute values (e.g., item ratings) and/or to infer implicit attribute values (e.g. item ratings) for user actions and/or from the user's hardware and/or software configurations. The recommendation/attribute value front end process 116 may also work in conjunction with the user interface process 114 to present recommendations and/or predicted attribute values to the users. For example, in the context of a content provider server, content, such as a text content (e.g., an article, book, etc.), video content, audio content, image content, and multimedia content, for example, may be recommended to the user. Alternatively, or additionally, a rank ordered list of such content may be presented to the user. In the context of an E-commerce server, items, such as a book, a movie, a household appliance, a consumer good, a business good, clothing, a financial instrument, etc. for example, may be recommended to the user. Alternatively, or additionally, a rank ordered list of such items may be presented to the user.

Now, more specifically referring to the back end device 130, a recommendation/attribute value back end process (or more generally, a "recommendation/attribute value back end facility") 132 may manage and interact with a personality type generation process (or more generally, a "personality type generator") 134 and an unknown attribute value prediction process (or more generally, an "attribute value predictor") 137 to provide recommendations or predicted attribute values to the recommendation/attribute value front end process 116. These processes and data structures are described in § 4.2.1.1 below. The recommendation/attribute value back end process 132 may also interact with an optional query cost/benefit analysis process (or more generally, a "query analyzer") 146 to determine whether or not to query the user for an attribute value (e.g., an item rating). The optional query cost/benefit analysis process 146 may use expected value of information information 142 which may be generated by optional expected value of information generation process (or more generally, a "VOI generator") 140. An optional data base management/pruning process ("or more generally, a "DB manager") 144 may also use the expected value of information information 142, which may be generated by optional expected value of information generation process 140, to manage or prune entries in the entity/attribute value storage 135. The optional value of information processes are described in § 4.2.1.2 below.

§ 4.2.1.1 Back end Attribute Value Prediction Processes and Data Structures

Figures 2, 3, 4:
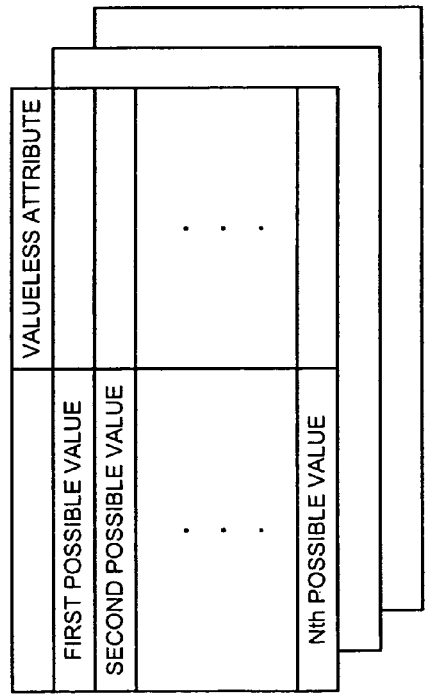
FIG. 2 illustrates a table data structure that may be used to store entity (e.g., user) records containing attribute (e.g., item) values (e.g., ratings).
FIG. 3 illustrates an array data structure that may be used to story a probability that an active user belongs to each of a plurality of personality types.
FIG. 4 illustrates an array data structure that may be used to associate probabilities that a valueless attribute (e.g., an unrated item) has each of a number of possible values.

The personality type generation process 134 may use known attribute values (e.g., item ratings) from a number of entities (e.g., users) (See storage facility 135.) to predict probabilities that a given entity (e.g., an active user) is each of a number of personality types (See storage facility 138.). FIG. 2 illustrates an exemplary table data structure that may be used to store entity (e.g., user) records containing attribute (e.g., item) values (e.g., ratings). FIG. 3 illustrates an array data structure that may be used to store a probability that an active user belongs to each of a plurality of personality types. Exemplary methods which may be used to effect the personality type generation process and the unknown attribute value prediction process are described in § 4.2.3 below with reference to FIGS. 6 and 7. However, an overview of possible features of the personality type generation process 134 and the unknown attribute value prediction process 137 are introduced here.

Before introducing features of the personality type generation process 134 and the unknown attribute value prediction process 137, notation used is first introduced here. In the following example, items or titles are recommended to an active user based on the ratings of titles by the active user and other others. Note that the following description can be generalized to predict (rather than recommend) any value (rather than a rating) of any attribute (rather than an item) associated with any entity (rather than a user). The number of users is denoted by "n", the set of all titles or items is denoted by "T", and "m" (=|T|) denotes the total number of titles or items in the set T. The n-by-m matrix of all user's ratings of all titles or items is denoted by "R". The $i^{th}$ user's rating of the $j^{th}$ title or item is denoted $R_{i,j}$, where each $R_{i,j} \in \Re \cup \{\perp\}$, i.e., is either a real number or $\perp$, which denotes "no rating". $R_i$ may be used to denote the $i^{th}$ row of the matrix R; namely, the vector of all of the $i^{th}$ user's ratings. One user $a \in \{1, 2, \ldots, n\}$ is distinguished as the active user. The subset of titles that the active user has not rated is defined as NR∈T. That is, the $j^{th}$ title or item is in the subset NR if and only if $R_{a,j}=\perp$. This subset of titles is the one for which predictions will be made.

Generally, a collaborative filter is a function "f" that accepts as input all ratings for all users and replaces some or all of the "no rating" symbols with predicted ratings. This new matrix may be denoted as P and defined as:

$$P_{a,j} = \begin{cases} R_{a,j}: & \text{if } R_{a,j} \neq \perp \\ f_a(R): & \text{if } R_{a,j} = \perp \end{cases} \quad (1)$$

It is assumed that the $i^{th}$ user's personality type can be described as a vector $$R_i^{true} = \langle R_{i1}^{true}, R_{i2}^{true}, \ldots, R_{im}^{true} \rangle$$

of "true" ratings for all seen titles. This vector of "true" ratings is used to encode a user's underlying, internal preferences for items or titles—these true ratings are not directly accessible. More specifically, its is assumed that users report ratings for titles that they've seen with some variability. In one embodiment, this variability is assumed to be Gaussian. More specifically, in that embodiment, the $i^{th}$ user's reported rating for the $j^{th}$ title or item is drawn from an independent normal distribution with mean $$R_{i,j}^{true}.$$

Specifically, $$Pr(R_{i,j} = x | R_{i,j}^{true} = y) \propto e^{-(x-y)^2/2\sigma^2}, \quad (2)$$

where σ is a free (e.g., tunable) parameter. Accordingly, it may be assumed that the same user may report different ratings on different occasions, perhaps depending on the context of any other title(s) rated in the same session, the user's mood when rating, or other external factors. Basically, all of these factors are summarized as Gaussian noise in expression (2).

Given a user's personality type, their ratings may be assumed to be independent. If y=⊥, then a uniform distribution over all ratings may be assumed.

It may be further assumed that the distribution of personality types or ratings vectors in the database is representative of the distribution of personalities in the target population of users. That is, a prior probability $$Pr(R_a^{true} = v)$$

that the active user rates items according to a vector v is given by the frequency that other users rate according to the vector v. Occurrences of personality types may be explicitly counted. Alternatively, instead of explicitly counting occurrences, $$R_a^{true}$$

may be defined simply as a random variable that can take on one of n values—$R_1, R_2, \ldots, R_n$—each with a probability of 1/n. That is, instead of explicitly counting occurrences of personality type (or ratings vectors), the probability that the true personality type is any one of a number of personality types, given n users, may be expressed as $$Pr(R_a^{true} = R_i) = \frac{1}{n} \quad (3)$$

From the foregoing assumptions, given the active user's actual ratings, and applying Bayes' rule, the probability that the active user is of the same personality type as any other user, may be expressed as:

$$Pr(R_a^{true} = R_i | R_{a1} = x_1, \ldots, R_{am} = x_m) \propto Pr(R_{a1} = \quad (4)$$
$$x_1 | R_{a1}^{true} = R_{i1}) \cdots Pr(R_{am} = x_m | R_{am}^{true} = R_{im}) \cdot Pr(R_a^{true} = R_i)$$

Recall from expression (3) that the $$Pr(R_a^{true} = R_i)$$

term can be assumed to be 1/n. Accordingly, once the quantity $$Pr(R_{aj} = x_j | R_{aj}^{true} = R_{ij})$$

is determined for all users, a probability distribution for the active user being each of the personality types can be determined. Recall from expression (2) that each of these quantities may be expressed as $$Pr(R_{i,j} = x | R_{i,j}^{true} = y) \propto e^{-(x-y)^2/2\sigma^2}.$$

Thus, an exemplary personality type generation process 134 has been described. Recall also element 138 of FIG. 1 and FIG. 3.

Figure 9:
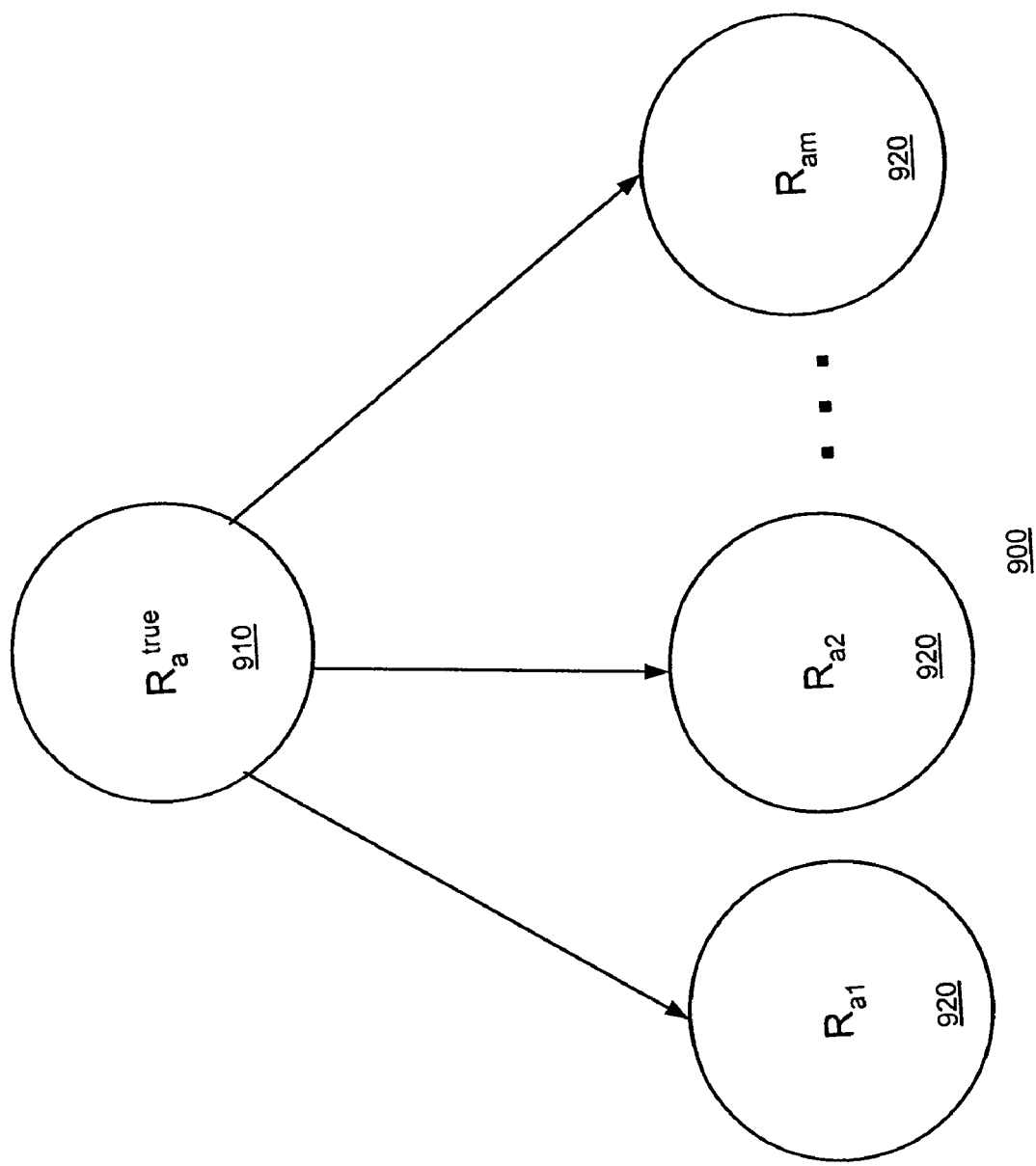
FIG. 9 is a naïve Bayesian network semantic for a "personality diagnosis" model.

Referring to FIG. 9, the right side of expression (4) may be depicted as a naive Bayesian network 900. That is, ratings ("evidence") 920 are observed and the probability that each personality type ("conclusion") 910 is the cause is determined. Then, as described below, the probability of rating values for an unseen or unrated title j may be determined.

Once a probability distribution for the active user being each of the personality types is determined, a probability distribution for the active user's rating of an unseen title (or titles) j can be determined by the unknown attribute value prediction process 137. This process 137 may determine the rating probability distribution for a given title or item j using the expression:

$$Pr(R_{aj} = x_j | R_{a1} = x_1, \ldots, R_{am} = x_m) = \quad (5)$$

-continued $$\sum_{i=1}^{n} Pr(R_{aj} = x_j | R_a^{true} = R_i) \bullet$$

$$Pr(R_a^{true} = R_i | R_{a1} = x_1, \ldots, R_{a1} = x_1, \ldots, R_{am} = x_m)$$

for each possible value of the $j^{th}$ item, where $j \in NR$. As can be appreciated, this prediction method has a time and space complexity on the order of the number of users times the number of titles or items. The results of the unknown attribute value prediction process 137 can be stored. (Recall, e.g., element 139 of FIG. 1. See also, FIG. 4 which illustrates an array data structure that may be used to associate probabilities that a valueless attribute (e.g., an unrated item) has each of a number of possible values.) Note that the first part of the summation of expression (5) can be determined using expression (2), namely, $$Pr(R_{i,j} = x | R_{i,j}^{true} = y) \propto e^{-(x-y)^2/2\sigma^2}.$$

Note further that the second part of the summation of expression (5) may have already been determined using expression (4) and stored. For a given unrated item j, the most probable rating may be used as the predicted rating.

Referring once again to the naïve Bayesian network 900 of FIG. 9, the conclusion 910 for each personality type corresponds to the second probability in the summation in equation (5).

§ 4.2.1.2 Expected Value of Information Processes and Data Structures

Formulating collaborative filtering to draw conclusions regarding a user's personality under uncertainty as described in § 4.2.1.1 above permits leveraging information and decision-theoretic methods to improve the present invention beyond merely predicting attribute values (e.g., item ratings). For example, expected value of information methods may be used, in conjunction with a cost-benefit analysis, to identify the most valuable new information to acquire in the context of a current probability distribution over states of interest. That is, expected value of information methods can be used to predict the benefit of requesting additional information, for example, in the form of a query to be explicitly answered by a user. More specifically, recommender systems in real-world application have been designed to acquire information by explicitly asking users to rate a set of titles or by watching the browsing or purchasing behavior of users and implying information from such behavior. Expected values of information methods could be used in an initial phase of information gathering, and/or in an ongoing manner, to gather the most beneficial information for purposes of predicted attribute values. Thus, queries subjected to a cost-benefit analysis (where the benefit is derived using expected value of information methods) can be employed to minimize the number of explicit ratings asked of users while maximizing the accuracy of the determined personality probabilities. The methods could also be harnessed to provide the most value set of n queries to make about a user's preferences given a specified limit in the number of questions explicitly asked of users. Information-theoretic approximations employ measures of the expected change in the information content with observation, such as relative entropy. (See, e.g., the article, M. Ben-Bessat, "Myopic Policies in Sequential Classification", *IEEE Transactions on Computers*, Vol. 27, pp. 170-178 (1978).) Such methods have been used with success in several Bayesian diagnostic systems. (See, e.g., Heckerman et al., "Toward Normative Expert Systems: Part I. The Pathfinder Project", *Methods of Information in Medicine*, Vol. 31, pp. 90-105 (1992).)

Clearly, when using expected value of information as the benefit component in a cost-benefit analysis, a cost of gathering the information (e.g., by querying a user to provide explicit information) should be represented. For example, cost may be represented as a monotonic function of the number of queries a user has been asked to answer (e.g., a number of items that a user has been asked to rate). Such a cost representation would reflect the frustration many users may experience with each additional rating requested. Thus, in an explicit service employing such a cost functions, users could be queried about titles in decreasing expected value of information order until the expected cost of additional request(s) outweighs the expected benefit of improved predictive accuracy given the additional information. In addition, questions could be tagged with differential costs associated with the difficulty of answering or evaluating specific questions, where such difficulty may even include discomfort felt in evaluating a preference the user may be uncomfortable expressing to the system.

Referring to FIG. 1, this use of expected value of information methods is depicted by process 140 which generates expected value of information information and stores it in a storage facility 142. A query cost/benefit analysis process 146 can then use such information, in conjunction with a cost function such as the one described above, the control information elicited by the recommendation/attribute value back end process 132.

Recall that, like memory-based recommender systems, the personality type generation process 134 has a time and space complexity on the order of the number of entities (e.g., users) times the number of attributes (e.g., titles or items). Expected value of information methods may also be used to prune (or ignore) certain entries, such as attributes for example, from those stored (Recall element 135 of FIG. 1.) to reduce the time and space complexity. Briefly stated, expected value of information methods may be used to reduce the amount of data needed to produce good recommendations. The average information gain of attributes (e.g., titles) and/or entities (e.g., users) in the data set can be determined and used to eliminate those of low value. As was the case with using value of information in the context of requesting or not requesting information from users, expected value of information methods can be used to generate a benefit. A cost function which considers the (incremental) costs of storage, and costs of computing delays, may be used in the cost-benefit analysis.

Having described exemplary processes and data structures that may be used by the present invention, exemplary apparatus for performing at least some of these processes are described in § 4.2.2 below. Exemplary methods which may be used to effect some of these processes are then described in § 4.2.3 below.

§ 4.2.2 Exemplary Apparatus

Figure 5:
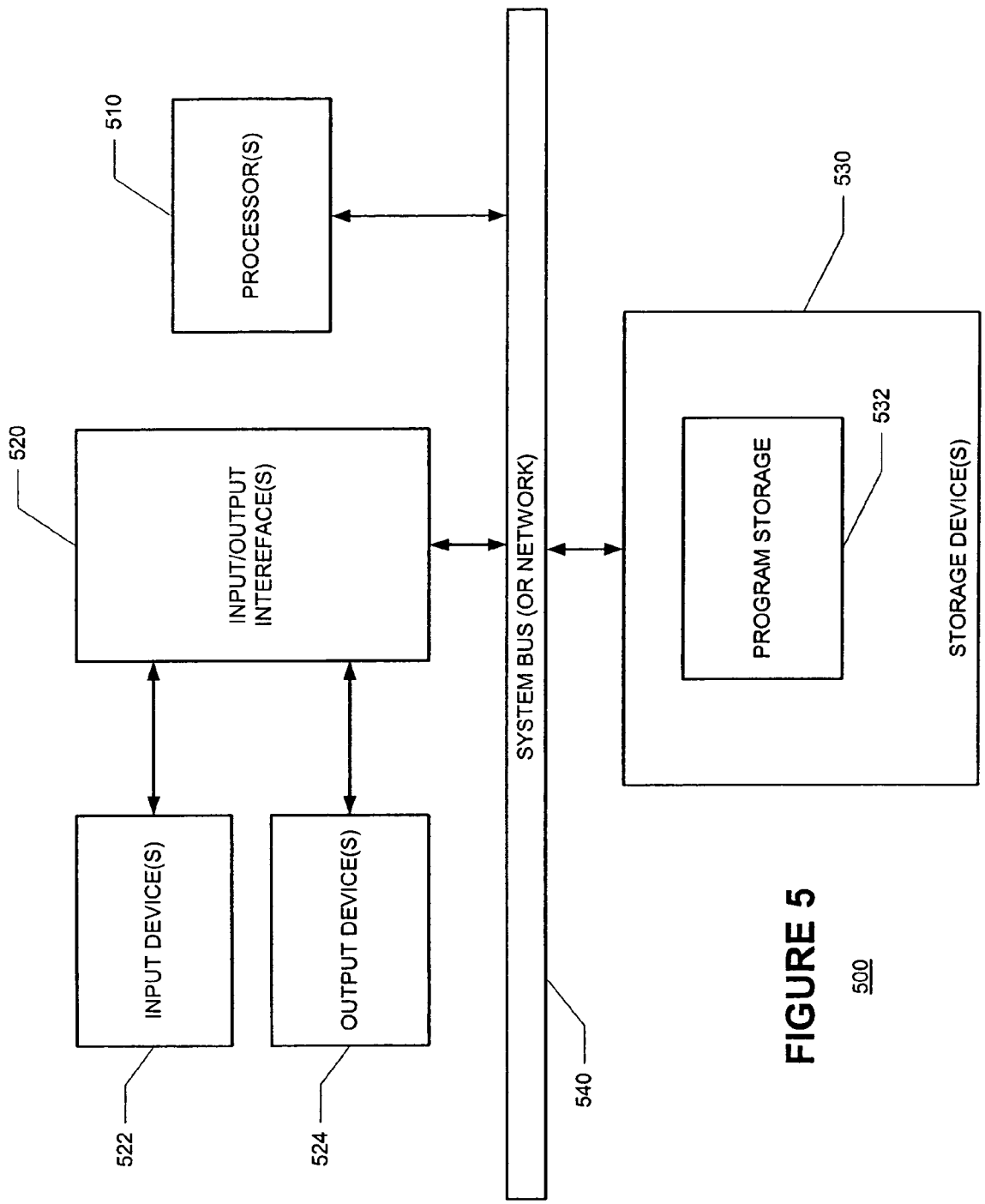
FIG. 5 is a high level block diagram of a machine that may be used to effect at least some of the processes of the present invention.

FIG. 5 is a high level block diagram of a machine 500 that may be used to effect at least some of the processes of the present invention. The machine 500 basically includes a processor(s) 510, an input/output interface unit(s) 520 coupled with an input device(s) 522 and an output device(s) 524, a storage device(s) 530 which may include program storage 532, and a system bus or network 540 for facilitating the communication of information among the coupled elements. The processor(s) 510 may execute machine-executable instructions to effect one or more aspects of the present invention. At least a portion of the machine executable instructions may be stored (temporarily or more permanently) on the storage device(s) 530/532 and/or may be received from an external source via an input interface unit 520.

The machine 500 may be a personal computer or server. That is, the processor(s) 510 may be a microprocessor, the storage devices 530 may be RAM, ROM, and/or disk-based, tape-based, or card-based storage, the input devices 522 may include a keyboard, a microphone, a pointer, a modem, a network interface, etc., and the output devices 524 may include a video monitor, a speaker, a mechanical feedback device, etc. Referring to FIG. 1, both the front end device (client) 110 and the back end device (server) 130 may be such a personal computer or server.

Having described processes, data structures and apparatus which may used to effect at least some aspects of the present invention, exemplary methods which may be used to effect at least some of the processes described in § 4.2.1 above are now described in § 4.2.3.

§ 4.2.3 Exemplary Methods

An exemplary method that may be used to effect the personality type generation process 134 is described in § 4.2.3.1 below with reference to FIG. 6. Then, an exemplary method that may be used to effect the process 137 for predicting unknown attribute values is described in § 4.2.3.2 below.

§ 4.2.3.1 Personality Type Generation

Figure 6:
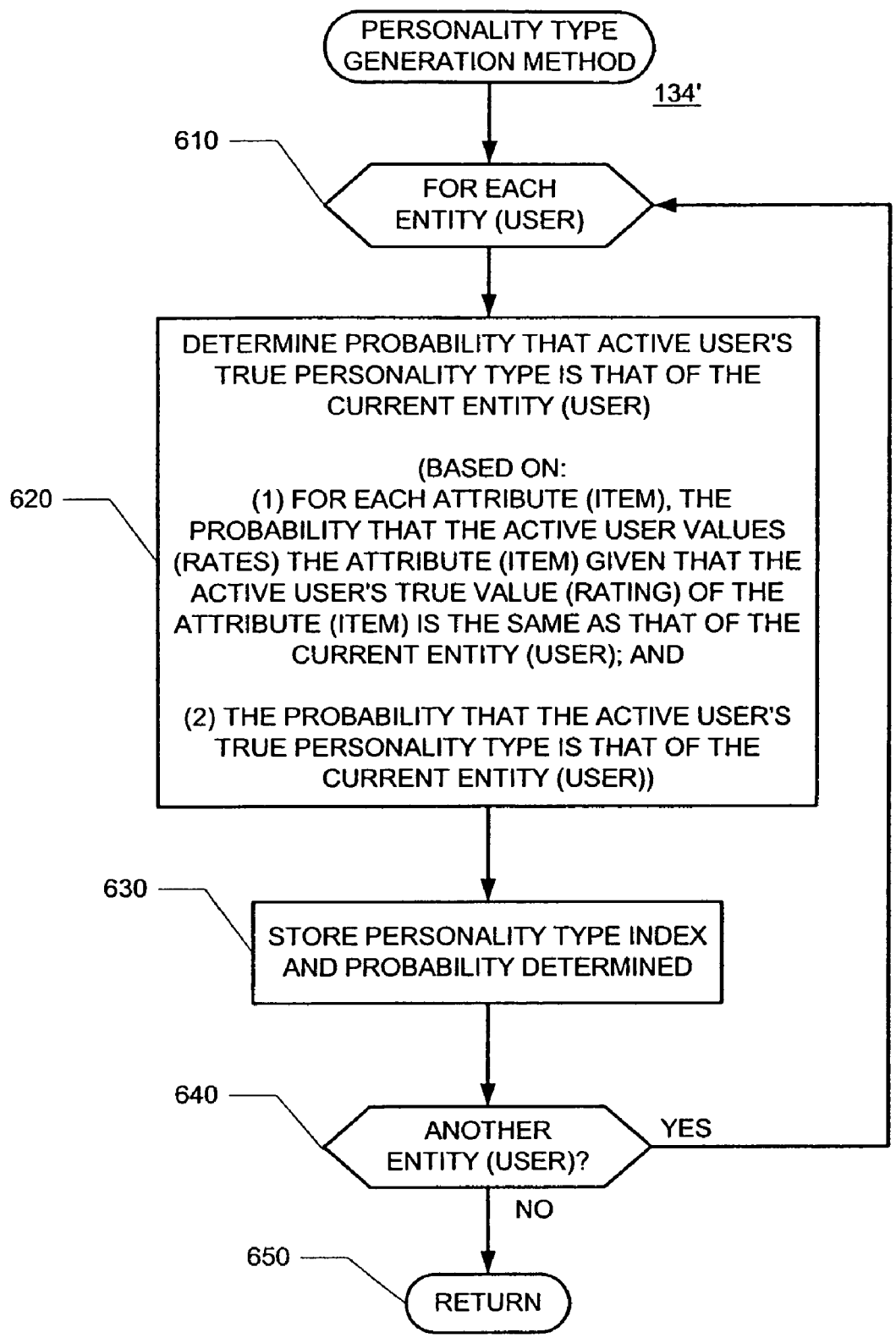
FIG. 6 is a flow diagram of a method that may be used to effect a personality type generation process.

FIG. 6 is a flow diagram of a method 134' that may be used to effect a personality type generation process 134. Since each existing entity (e.g., user) defines a personality type, a personality type probability is predicted for each entity (e.g., user) as indicated by the loop 610-640. More specifically, for each entity (e.g., user), the probability that an active user's "true" personality type is that of the current entity (e.g., user) is determined as shown in block 620. This determination may be based on two factors. The first factor is, for each attribute (e.g., item), a probability that the active user values (e.g., rates) the attribute (e.g., item) given that the user's true value (e.g., rating) of the attribute (e.g., item) is the same as that of the current entity (e.g., user). (Recall expression (4) above. Recall further that this portion of expression (4) may be solved in accordance with expression (2).) The second factor is a probability that the active user's true personality type is that of the current entity (e.g., user). (Recall expression (4) above. Recall further that this portion of expression (4) may be approximated by expression (3).) The probability may then be stored along with an associated personality type index or identifier as shown in block 630. (Recall element 135 of FIG. 1, and FIG. 3.) Once personality type probabilities for each of the entities (e.g., users) has been determined, the method 134' is left via RETURN node 650.

§ 4.2.3.2 Unknown Attribute Value Prediction

Figure 7:
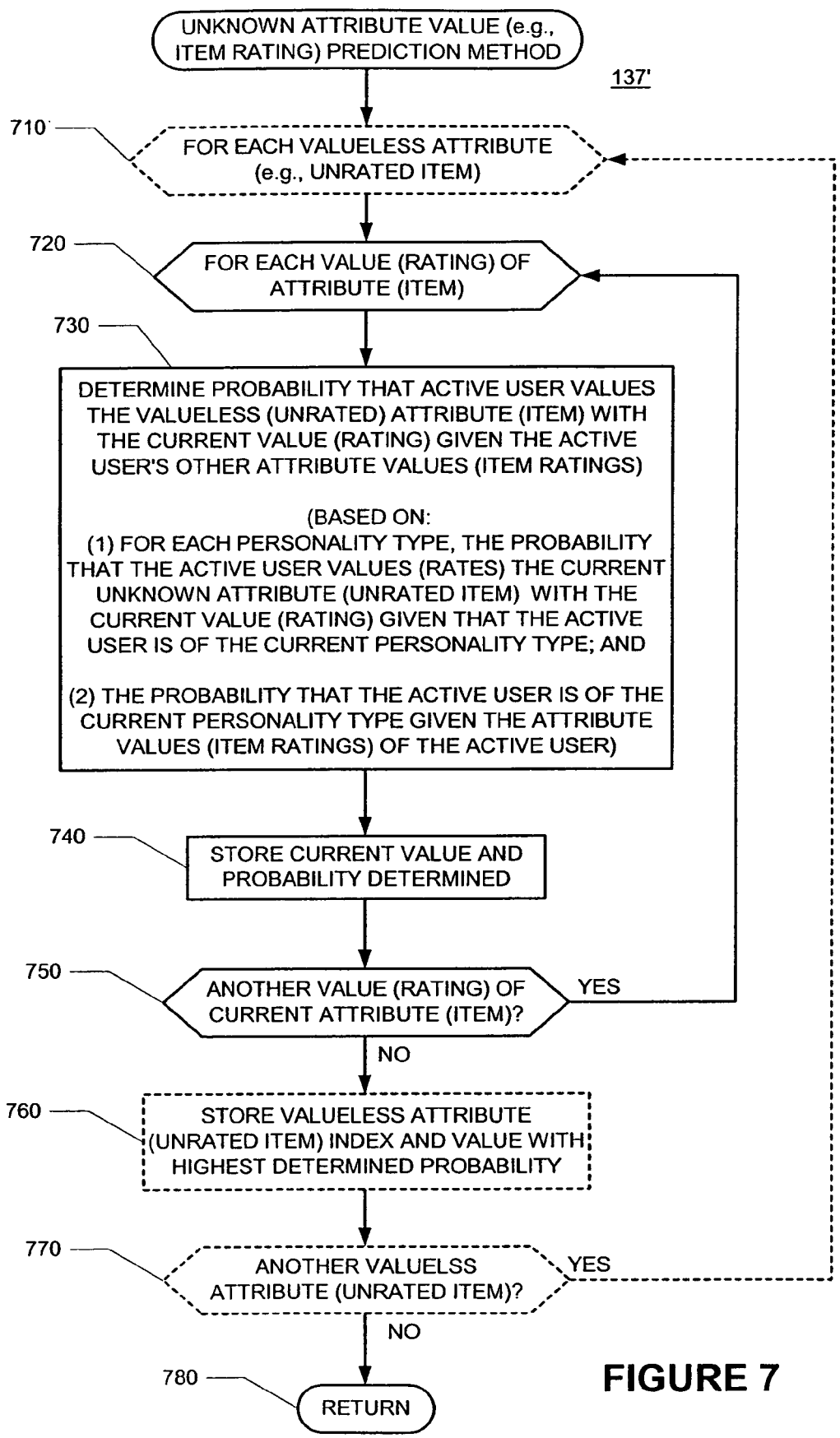
FIG. 7 is a flow diagram of a method that may be used to predict probabilities that an unknown attribute value (e.g., rating of an unrated item) is one of a number of possible values (e.g., possible ratings).

FIG. 7 is a flow diagram of a method 137' that may be used to predict probabilities that an unknown attribute value (e.g., rating of an unrated item) is one of a number of possible values (e.g., possible or permitted ratings). As shown by loop 710-770, this method may predict values for each of the unvalued attributes (e.g., unrated items) and store them as shown in block 760. (Recall the subset of titles that the active user has not rated is defined as NR∈T.) Alternatively, probabilities of values (e.g., ratings) of a single (or a set of) given valueless attribute (e.g., unrated item) can be determined.

As indicated by loop 720-750, blocks 730 and 740 are performed for each possible or permitted value (e.g., rating) of the valueless attribute (e.g., unrated item). For example, if possible ratings of movies are whole numbers from 1 to 7, the possible or permitted values would be 1, 2, 3, 4, 5, 6 and 7, and a probability that the rating would be each of these possibilities would be determined.

Given a particular possible or permitted value (e.g., rating), as shown by block 730, the probability that the active user values (e.g., rates) the valueless attribute (e.g., unrated item) with the current value (e.g., rating) given the active user's other attribute values (e.g., item ratings) is determined. This determination may be made based on two factors. The first factor is, for each personality type, the probability that the active user values (e.g., rates) the current valueless attribute (e.g., unrated item) with the current value (e.g., rating) given that the active user is of the current personality type. (Recall expression (5) above. Recall further that this portion of expression (5) may be solved in accordance with expression (2).) The second factor is the probability that the active user is of the current personality type given the attribute values (e.g., item ratings) of the active user. (Recall expression (5) above. Note that this portion of expression (5) has been determined by the process 134 and stored.)

As shown in block 740, the current value and its associated probability are stored. (See, e.g., 139 of FIG. 1 and FIG. 4.) Note that for similar types of attributes (e.g., movies), it is expected that the possible or permitted values (e.g., ratings) will be the same. If so, the probabilities may be stored in a table data structure. However, it is possible that entities will have different type of attributes having different possible or permitted values. For example, a user's "age attribute" may be a whole number having a possible value from 1 to 150, while that user's "number of computer's in home attribute" may be whole number from 1 to 10, and their "Star Wars—The Phantom Menace rating attribute" may be a whole number from 1 to 7 for example.

As shown in block 760, the most probable possible or permitted value (e.g., rating) is used as a prediction of the value (e.g., rating). That is, the prediction provides a single value (e.g., rating) for a given valueless attribute (e.g., unrated item).

After the values of one or more valueless attributes (e.g., unrated items) are predicted, the method 137' is left via RETURN node 780.

Having described exemplary processes, exemplary methods for effecting those processes, and data structures and apparatus for practicing the present invention, an example of operations of an exemplary embodiment of the present invention is now described in § 4.3 below.

§ 4.3 Example(s) of Operation

Figure 8:
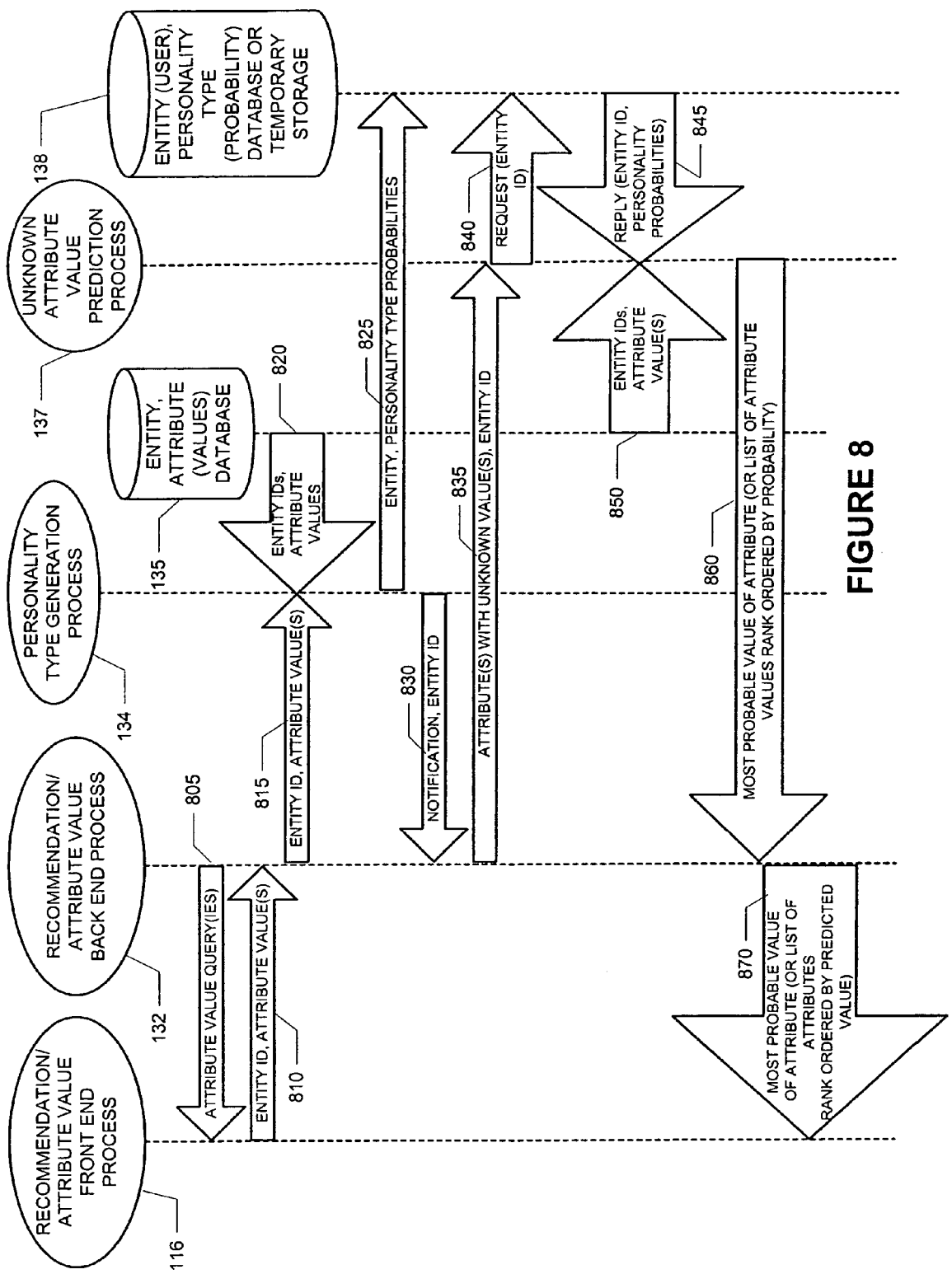
FIG. 8 is a messaging diagram that illustrates an example of operations of the present invention.

FIG. 8 is a messaging diagram which illustrates an example of an end-to-end operation of the exemplary system 100 of FIG. 1. As shown in communication 805, the recommendation/attribute value back end process (hereafter referred to as "the RAV back end process") 132 can submit queries to the recommendation/attribute value front end process (hereafter referred to as "the RAV frond end process") 116 for values (e.g., ratings) of attributes (e.g., titles). Although not shown here, as described in § 4.2.1.2 above, a query cost/benefit analysis process (Recall element 146 of FIG. 1.) may use expected "value of information" information to determine what attribute values (e.g., item ratings) to ask for. Such queries may be presented to the user via the user interface process 114 (not shown) and displayed via a video monitor and/or rendered on a speaker. As shown in communication 810, the RAV front end process 116 may then reply with attribute values (e.g., item ratings) corresponding to the queries. The communication 810 should also include some type of information for uniquely identifying the entity with which the RAV front end process 116 is associated (e.g., a user ID, a MAC address, a cookie, etc.). Alternatively, or in addition, implied attribute values (e.g., item ratings) may be provided.

As indicated in communication 815, the RAV back end process 132 may then forward the entity ID and attribute values to the personality type generation process 134. Recall from FIGS. 1 and 6 that this process 134 may use such information, in conjunction with the attribute values (e.g., item ratings) of other entities (e.g., users), as shown in communication 820, to generate personality type probabilities. The entity and its associated personality type probabilities may then be stored as indicated by communication 825. Further, once the personality type generation process 134 is done, it can inform the RAV back end process 132 as shown in communication 830.

The RAV back end process 132 may then provide one or more attributes with unknown values (e.g., items not rated by the active user), along with some type of entity ID, to the unknown attribute value prediction process 137 as shown in communication 835. This process 137 may use the entity ID to request the personality probabilities associated with the entity as shown in communication 840. (Recall, e.g., FIG. 3.) The personality probabilities are returned from the storage facility 138 as shown in communication 845. The attribute values (e.g., item ratings) of the other entities (e.g., users) are also provided to the unknown attribute value prediction process 137 as indicated by communication 850.

The unknown attribute value prediction process 137 then determines, for each of the unknown attributes (e.g., unrated items) requested, probabilities for each possible value (e.g., rating). For each of the unknown attributes (e.g., unrated items) requested, the process 137 returns the most probable value to the RAV back end 132 as shown in communication 860. The RAV back end 132 may then forward this information to the RAV front end 116 for presentation to the user as indicated by communication 870. For example, the user may be presented with a recommended item. For example, given a number of movies that the user has not rated, recommending that the user see the movie with the highest predicted rating. In another example, given a number of items that the user has not purchased or rated, recommending that the user purchase the item with the highest predicted rating. Alternatively, a list of attributes, rank ordered by predicted values, may be presented to the user.

Having illustrated an example of end-to-end operations in an exemplary system 100, an example illustrating the operation of the exemplary personality type generation method 134' and the exemplary unknown attribute value prediction method 137' is now provided. In the following example, it is assumed that two users have rated two movies, each with a whole number from 1 to 4. An active user has rated the first movie but has not rated the second movie. The active user's predicted rating of the second movie is derived. The exemplary data is summarized in the following table:

| USER | FIRST MOVIE | SECOND MOVIE |
|---|---|---|
| 1 | 2 | 3 |
| 2 | 1 | 4 |
| ACTIVE | 3 | ⊥ |

It is also assumed that $2\sigma^2=1$. Although such a small set of ratings and users would not generally provide particularly useful results, it is useful to illustrate the operations of the methods 134' and 137'.

Using expressions (2) and (3) in the right-hand side of expression (4), we have:

$$e^{-(3-2)^2/1} \cdot \frac{1}{2} = 0.184; \text{ and}$$

$$e^{-(3-2)^2/1} \cdot \frac{1}{2} = 0.009.$$

Normalizing, we have:

$$Pr(R_a^{true}=R_1 \mid R_{aI}=3) = \frac{0.184}{0.184+0.009} = 0.953; \text{ and}$$

$$Pr(R_a^{true}=R_2 \mid R_{aI}=3) = \frac{0.009}{0.184+0.009} = 0.047.$$

At this point, the exemplary personality type generation method 134' is complete.

Using the resulting personality type probabilities, expression (2) and expression (5), we determine, for each of the possible or permitted rating values:

$$Pr(R_{a2}=1 \mid R_{a1}=3)=e^{-(1-3)^2/1} \cdot 0.953+e^{-(1-4)^2/1} \cdot 0.047=0.017+0.000=0.017;$$

$$Pr(R_{a2}=2 \mid R_{a1}=3)=e^{-(2-3)^2/1} \cdot 0.953+e^{-(2-4)^2/1} \cdot 0.047=0.351+0.001=0.352;$$

$$Pr(R_{a2}=3 \mid R_{a1}=3)=e^{-(3-3)^2/1} \cdot 0.953+e^{-(3-4)^2/1} \cdot 0.047=0.953+0.017=0.970; \text{ and}$$

$$Pr(R_{a2}=4 \mid R_{a1}=3)=e^{-(4-3)^2/1} \cdot 0.953+e^{-(4-4)^2/1} \cdot 0.047=0.351+0.047=0.398.$$

Taking the possible or permitted value with the maximum probability, it is predicted that the active user would rate the second movie with a 3.

§ 4.4 Conclusions

As can be appreciated from the foregoing, the present invention provides new recommendation technique in which all data may be maintained throughout the processes, new data can be added incrementally, and predictions have meaningful probabilistic semantics. Each user's reported attributes (e.g., item ratings or preferences) may be interpreted as a manifestation of their underlying personality type. The probabilistic determinations may be used to determine expected value of information. Such an expected value of information could be used in at least two ways. First, an interactive recommender could use expected value of information to favorably order queries for attribute values (e.g., item ratings), thereby mollifying what could otherwise be a tedious and frustrating process. Second, expected value of information could be used to determine which entries of a database to prune or ignore—that is, which entries, which if removed, would have a minimal effect of the accuracy of recommendations.

What is claimed is:

1. A computer readable medium including computer readable code that facilitates collaborative filtering when implemented on a computer comprising:
a personality type generator that analyzes known attributes relating to a user and calculates probabilities that the user has a personality type substantially similar to personality types of a plurality of disparate users, wherein the personality types of the plurality of disparate users are based at least in part upon attributes related to such users;

an attribute value predictor that predicts unknown attributes relating to the user based at least in part upon the calculated probability for each personality type, the attribute value predictor determining a set of values for each unknown attribute;

a query cost-benefit analyzer that employs the determined set of values to minimize the number of explicit queries to the user while maximizing accuracy of a calculated personality probability, the query cost-benefit analyzer weighs a cost of disturbing the user against a benefit of providing the user with the recommendation prior to providing the user with the recommendations; and a database manager that employs the determined set of values to determine an entry of a database to prune such that the entry when removed has minimal effect on accuracy of prediction.

2. The computer readable medium of claim 1, further comprising a recommendation facility that provides recommendations to the user based at least in part upon the predicted attributes.

3. The computer readable medium of claim 1, further comprising a query facility that requests an attribute from the user.

4. The computer readable medium of claim 3, the query facility weighs a cost of disturbing the user against a benefit of obtaining the attribute prior to requesting the attribute from the user.

5. The computer readable medium of claim 3, the query facility employs expected value of information in connection with requesting the attribute from the user.

6. The computer readable medium of claim 5, attributes are selectively requested from the user based upon one or more of a discriminatory value of information relating to the user and a consideration of a likelihood that the user is familiar with items being asked about given current uncertainty about the user.

7. The computer readable medium of claim 6, attributes are selectively requested from the user based upon a discriminatory value of the information, including an analysis of a consideration of a likelihood of different answers to a query given current uncertainty about the user.

8. The computer readable medium of claim 1, the personality types of the plurality of disparate users generated using at least known attributes relating to each of the plurality of disparate users.

9. The computer readable medium of claim 8, the known attributes relating to the plurality of disparate users is accessible from a data table.

10. The computer readable medium of claim 9, further comprising a pruning facility, the pruning facility employed to reduce a number of known attributes to consider when generating the personality types of the plurality of users.

11. The computer readable medium of claim 1, the known attributes relating to the user associated with a calculated variability.

12. The computer readable medium of claim 11, the variability is Gaussian.

13. The computer readable medium of claim 1, the personality types are at least partially defined by vectors, the vectors include attributes relating to the plurality of disparate users.

14. The computer readable medium of claim 13, the probabilities that the user has a personality type substantially similar to personality types of the plurality of disparate users are calculated at least partially by a frequency that the plurality of disparate users rate items according to the vectors.

15. The computer readable medium of claim 14, a number of occurrences that the disparate users rate items according to the vectors are explicitly counted.

16. The computer readable medium of claim 1, the personality type generator determines at least one probability that the user has a personality type substantially similar to any other personality type by employing the expression $$Pr(R_a^{true}=R_i\{R_{a1}=X_{1,...}R_{am}=x_m)\propto Pr(R_{a1}=x_m\{R_{a1}^{true}=R_{i1})..Pr(R_{am}=x_m\{R_{am}^{true}=R_{im})\cdot Pr(R_a^{true}=R_i)$$

where $R_a^{true}$ is a vector of the user's internal preferences for one or more titles, $R_1$ is a vector of a disparate user's ratings, $R_a$ is a vector of the user's actual ratings, and x is a particular rating within $R_i$.

17. The computer readable medium of claim 16, wherein $Pr(R_a^{true}=R_1)$ is assumed to be $$\frac{1}{n},$$

where n is a number of the disparate users.

18. The computer readable medium of claim 16, the attribute value predictor at least partially predicts unknown attributes relating to the user by employing the expression $$Pr(R_{aj}=x_j \mid R_{a1}=x_1, \ldots, R_{am}=x_m) = \sum_{i=1}^{n} Pr(R_{aj}=x_j \mid R_a^{true}=R_i) \cdot Pr(R_a^{true}=R_i \mid R_{a1}=x_1, \ldots, R_{am}=x_m)$$

where j is an attribute that has not been rated by the user.

19. The computer readable medium of claim 1, the personality generator employs a Bayesian Network to calculate the probabilities that the user has a personality type substantially similar to personality types of the plurality of disparate users.

20. The computer readable medium of claim 1, residing on a server.

21. The computer readable medium of claim 1, accessed over a network.

22. A method for providing recommendations to a user, comprising:

collecting attributes from a user, the attributes relate to items accessible via a browser;

calculating a probability that the user has a personality type substantially similar to a disparate user based at least in part upon the collected attributes and attributes related to the disparate user;

generating a set of values for each attribute for the user based at least in part upon the calculated probability;

weighing a cost of disturbing the user against a benefit of providing the user with the recommendation prior to providing the user with the recommendations;

recommending an item to a user based at least in part upon the generated attributes; and employing the generated set of values to at least one of minimize the number of explicit queries to the user while maximizing the accuracy of the recommendations or determining an entry of a database to prune such that the entry when removed has minimal effect on accuracy of the recommendations.

23. The method of claim 22, further comprising selectively requesting attributes from the user based upon a value of obtaining the information.

24. The method of claim 23, further comprising selectively requesting attributes from the user based upon a use of expected value of information.

25. The method of claim 24, further comprising selectively requesting attributes from the user based upon one or more of a discriminatory value of information relating to the user and a consideration of a likelihood that the user is familiar with items being asked about given current uncertainty about the user.

26. The method of claim 25, further comprising selectively requesting attributes from the user based upon a discriminatory value of the information, including an analysis of a consideration of a likelihood of different answers to a query given current uncertainty about the user.

27. The method of claim 22, one or more of the attributes being ratings relating to items.

28. The method of claim 27, the items being one or more of video content, textual content, audio content, image content, multi-media content, a service, a consumer good, a business good, clothing, and a financial instrument.

29. The method of claim 22, further comprising calculating a plurality of probabilities that the user has a personality type substantially similar to a plurality of disparate users based at least in part upon the collected attributes and attributes related to the disparate users.

30. The method of claim 22, further comprising selectively reducing a number of attributes to consider when calculating the probability that the user has a personality type substantially similar to the disparate user.

31. The method of claim 22, further comprising employing a Bayesian network in connection with recommending the item to the user.

32. A system that facilitates Internet searching, comprising:
   means for collecting attributes relating to an entity;
   means for comparing the collected attributes with attributes related to a plurality of disparate entities;
   means for calculating probabilities that the entity has a personality type substantially similar to a personality type of the disparate entities based at least in part upon the comparison;
   means for generating a set of new values for each attribute relating to the entity based at least in part upon the calculated probabilities;
   means for weighing a cost of disturbing the user against a benefit of providing the user with the recommendation prior to providing the user with the recommendations; and
   means for employing the generated set of values to at least one of minimize the number of explicit queries to the user while maximizing the accuracy of a recommendation or determining an entry of a database to prune such that the entry when removed has minimal effect on accuracy of the recommendation.

33. The system of claim 32, further comprising means for providing the entity with a recommendation based at least in part upon the new attributes.

* * * * *